United States Patent Office

3,468,871
Patented Sept. 23, 1969

3,468,871
METAL-CONTAINING MONOAZO DYESTUFFS
Klaus Leverenz and Alois Gottschlich, Leverkusen, Germany, assignors to Farbenfabriken Bayer Aktiengesellschaft, Leverkusen, Germany, a German corporation
No Drawing. Filed Mar. 17, 1965, Ser. No. 440,629
Claims priority, application Germany, Mar. 26, 1964,
F 42,442
Int. Cl. C09b 29/36, 45/22
U.S. Cl. 260—145                    20 Claims

ABSTRACT OF THE DISCLOSURE

Complexes of a metal such as chromium, manganese, iron, cobalt, nickel and copper with a dyestuff or a mixture of dyestuffs of the formula:

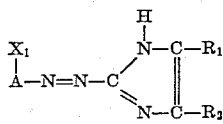

in which A is substituted or unsubstituted phenylene or naphthylene; $X_1$ is a substituent in the o-position to the azo group and is capable of being complexed with a metal; and $R_1$ and $R_2$ are hydrogen, substituted or unsubstituted phenyl, heterocyclic, or, when taken together, are cycloaliphatic.

Mixed metal complexes of the above compound with a second azo dyestuff such as

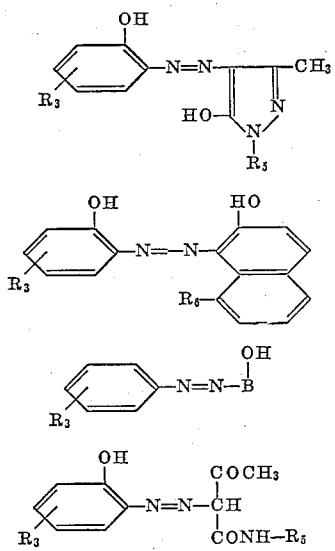

in which B is a divalent residue of an enolic or phenolic coupling compound containing the OH group in a position adjacent to the azo bridge; $R_3$ is sulfonamide, substituted sulfonamide, nitro, hydrogen or chloro; $R_5$ is phenyl; and $R_6$ is hydrogen or an acyl derivative of ammonia.

---

The present invention relates to novel azo dyestuffs; more particularly it relates to metal complexes of monoazo dyestuffs of the formula

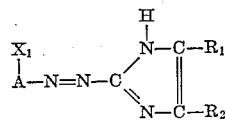

In this formula A stands for a radical from the benzene or naphthalene series in which the substituent $X_1$ is in the ortho-position relative to the azo group, $X_1$ stands for a substituent complex bonded to the metal, and $R_1$ and $R_2$ represent hydrogen, alkyl, cycloalkyl, aralkyl and/or aromatic-carbocyclic or -heterocyclic radicals where the alkyl groups may be linked to form a ring, optionally with the inclusion of heteroatoms. The radical A and the substituents $R_1$ and $R_2$ may contain other substituents, for instance halogen atoms, alkyl, alkoxy, aralkyl, hydroxyl, nitro, cyano, primary, secondary or tertiary amino, acylamino, carboxylic acid, sulphonic acid, alkyl-sulfonyl, aryl-sulfonyl, carboxylic acid ester or optionally substituted carboxylic acid amide or sulfonic acid amide groups as well as further azo groupings; the dyestuffs may also exhibit fiber-reactive substituents.

The novel metal-containing azo dyestuffs are obtained by the action of metal discharging agents on azo dyestuffs of the formula

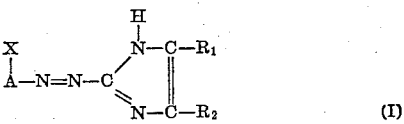

wherein A, $R_1$ and $R_2$ have the above indicated meaning, X stands in A in the ortho-position relative to the azo group and X is a complex forming substituent or a substituent which is converted to a group of this type under the metallizing conditions.

Examples of metal complex forming groups X are —OH, optionally substituted amino groups and —COOH; substituents which are converted to metal complex bonded groups under the metallizing conditions include alkoxy, chloro, acyloxy such as for instance benzenesulfonyloxy and carbalkoxy groups, hydrogen and sulfonic acid groups (converted into metal complex bound substituents by oxidative coppering in the case of the last two substituents).

Azo dyestuffs of the Formula I can be prepared in known manner by coupling diazotized amines

A—NH$_2$ wherein A and X have the above specified significance and X is in the ortho-position relative to the amino group, with imidazole or its derivatives substituted at the 4- and/or 5-position by alkyl, aralkyl, aryl or cycloalkyl, where the alkyl radicals may also be joined to form a closed ring, optionally with the inclusion of heteroatoms. Suitable diazo components which may be considered for application for this purpose are, for instance, derived from:

2-amino-1-hydroxy-benzene,
3-amino-4-hydroxy-1-methylbenzene,
4-chloro-2-amino-1-hydroxybenzene,
4,6-dichloro-2-amino-1-hydroxybenzene,
4- or 5-nitro-2-amino-1-hydroxybenzene,
5-nitro-3-amino-2-hydroxy-1-methylbenzene,
5-nitro-3-amino-4-hydroxy-1-methylbenzene,
4-chloro-6-nitro-2-amino-1-hydroxybenzene,
6-chloro-4-nitro-2-amino-1-hydroxybenzene,
4-chloro-5-nitro-2-amino-1-hydroxybenzene,
4,6-dinitro-2-amino-1-hydroxybenzene,
6-nitro-2-amino-4-acetylamino-1-hydroxybenzene,
3-amino-4-hydroxyacetophenone,
2-aminophenol-4-sulfonic acid,
2-aminophenol-4-sulfonic acid amide,
2-aminophenol-4-sulfonic acid methylamide,
2-aminophenol-4-sulfonic acid dimethylamide,
2-aminophenol-4-sulfonic acid anilide,
(3-amino-4-hydroxyphenyl)-methyl-sulfone,
(3-amino-4-hydroxyphenyl)-ethyl-sulfone,
2-aminophenol-5-sulfonic acid amide and its N-substituted derivatives, (4-amino-3-hydroxyphenyl)-ethyl-sulfone,
(4-amino-3-hydroxyphenyl)-benzyl-sulfone,
1-amino-2-hydroxynaphthalene-4-sulfonic acid,
1-amino-2-hydroxy-6-nitronaphthalene-4-sulfonic acid,
2-aminobenzoic acid,
4- or 5-chloro-2-aminobenzoic acid,
4- or 5-nitro-2-aminobenzoic acid, and
2-aminobenzoic acid-4- or -5-sulfonamide.

When in the general formula of the monoazo dyestuffs X represents a substituent which is converted to an —OH group or an optionally substituted amino group during the metallizing operation, the diazo components which may be applied are for instance derived from the following amines:

2-chloro-5-nitro-7-aminobenzene,
2-chloro-1-aminobenzene-5-sulfonic acid amide,
2-chloro-1-aminobenzene-5-sulfonic acid methylamide,
(4-chloro-3-aminophenyl)-methyl-sulfone,
(4-chloro-3-aminophenyl)-ethyl-sulfone,
3-aminobenzene-sulfonic acid-(1), and
2-aminobenzene-disulfonic acid-(1,4).

The imidazoles employed as the coupling components may be obtained by known methods, for instance by the reaction of α-hydroxy- or α-halogen-ketones with formamide [H. Bredereck and G. Theilig, Chem. Ber. 86, 88 (1953)]. Suitable coupling components are, for instance:

imidazole,
4,5-dimethyl-imidazole,
4,5-diethyl-imidazole,
4,5-dipropyl-imidazole,
4,5-di-n-butyl-imidazole,
4,5-di-isobutyl-imidazole,
4,5-di-n-amyl-imidazole,
4,5-bis-(β-phenyl-ethyl)-imidazole,
4,5,6,7-tetrahydrobenzimidazole,
4-(5)-phenyl-5-(4)-ethyl-imidazole,
4-(5)-phenyl-imidazole,
4,5-diphenyl-imidazole,
4,5-bis-(2'-chlorophenyl)-imidazole,
4,5-bis-(4''-bromophenyl)-imidazole,
4,5-bis-(4'-methoxyphenyl)-imidazole,
4-(5)-phenyl-5-(4)-(4'-dimethylaminophenyl)-imidazole,
4,5-bis-(α-furyl)-imidazole, and
4,5-bis-(5'-bromo-2'-hydroxyphenyl)-imidazole.

Coupling of the starting components is carried out in an aqueous or organic-aqueous medium, preferably at pH values greater than 7. Pyridine is preferably employed as the organic solvent.

The complex forming metals employed for the process according to the invention are preferably those of atomic number 24 to 29, and in particular agents discharging copper, nickel, chromium and cobalt. Metallizing with these substances is carried out in an aqueous, organic or organic-aqueous medium. Acetone, glycol, formamide, and dimethylformamide have proved particularly suitable as organic solvents for this purpose, and they are employed by themselves, as mixtures with each other or as mixtures with water. It is possible to prepare 1:1 or also 1:2 complexes.

Metallizing can be carried out with or without the addition of acid binding agents. Aqueous or alcoholic solutions of ammonia or alkali metal hydroxides may be mentioned as examples of acid binding agents. Mixtures of different monoazo dyestuffs of Formula I or mixtures of a monoazo dyestuff (I) of this type with another azo dyestuff which forms metal complexes may also be employed for the metallizing operation.

The dyestuff-metal complexes obtainable according to the invention are particularly suitable for dyeing natural of synthetic polyamide fiber materials such as wool, silk, leather, synthetic superpolyamides and superpolyurethanes. Especially valuable dyeings are obtained with the dyestuff-cobalt complex compounds. Excellent fastness properties to light, washing, perspiration and sea water are for instance obtained on synthetic superpolyamide fibers.

The water-insoluble dyestuff-metal complexes often possess a good solubility in organic solvents, especially in ketones and glycols and are, therefore, suitable for, e.g., the dyeing of organic liquors or lacquers on the base of spirit-soluble nitrocellulose, natural or synthetic resins, ester- and ketone-soluble vinyl chloride polymerizates as they are used for the preparation of mordants for staining wood or ball pen pastes. Furthermore, they are suitable for the dyeing of foils or spinning solutions, such as foils or spinning solution of cellulose esters or cellulose ethers, polyester resins, celluloid or polymethacrylic resins.

The parts specified in the following examples, given for the purpose of illustrating the invention, are parts by weight.

EXAMPLE 1

A suspension of the diazo compound prepared as usual at 0–5° C. from 13.7 parts of 2-aminophenol-sulfonic acid-(4)-amide, 20 parts of 30% hydrochloric acid, 5 parts of sodium nitrite and 150 parts of water is added at 0–5° C. to a mixture of 17 parts of 4,5-diphenylimidazole, 100 parts of pyridine, 40 parts of 40% sodium hydroxide solution and 50 parts of ice, and stirred at 0–5° C. until coupling has been completed. The resultant dyestuff is precipitated by the addition of 130 parts of 30% hydrochloric acid, filtered off with suction, washed with water and dried. It consists of an orange coloured powder and has the following composition.

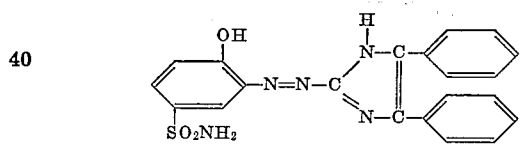

6.1 parts of this dyestuff in 100 parts of formamide and 50 parts of dimethylformamide are heated at 80° C. for 4 hours with 2.2 parts of crystalline chromic chloride, whilst stirring. The reaction mixture is poured into 500 parts of water and the resultant 1:2-chromium complex precipitated by the addition of hydrochloric acid, filtered off with suction and dried. It consists of a dark powder which dyes wool and synthetic superpolyamide fibres from a weakly acidic or neutral liquor to dark green shades with good wet fastness properties.

EXAMPLE 2

3 parts of crystalline cobalt sulfate are dissolved in 35 parts of water, 30 parts of 25% ammonium hydroxide solution and 1 part of 30% hydrogen peroxide solution are added, and after stirring for one hour the mixture is added at 80° C. to a solution of 9.1 parts of the metal-free dyestuff obtained according to the process of paragraph 1 of Example 1 in 150 parts of water and 15 parts of 40% sodium hydroxide solution. The temperature is kept at 80° C. for 15 minutes and the solution is clarified with active charcoal. The resultant cobalt complex is precipitated by the addition of acetic acid, filtered off with suction and washed with water. When dried, it consists of a dark powder which dyes wool and synthetic superpolyamide fibres from a weakly acidic or neutral liquor uniformly to fast bluish green shades. The dyeings have good general fastness properties and fastness to light.

Similar dyestuffs are obtained when the diazo and/or coupling component in Example 1 is replaced by the compounds listed in the following table and they are metallized by the specified method:

| Diazo component | Coupling component | Type of complex | Color shade of complex on synthetic superpolyamide fibers |
|---|---|---|---|
| 2-aminophenol-4-sulfonic acid amide. | Imidazole | Co | Blue grey. |
| Do | 4-phenylimidazole | Co | Violet. |
| 2-aminophenol-4-sulfonic acid methylamide. | 4,5-diphenylimidazole | Co | Blue green. |
| Do | do | Cr | Bluish green. |
| 2-aminophenol-5-sulfonic acid amide. | do | Co | Do. |
| Do | do | Cr | Dark green. |
| (3-amino-4-hydroxyphenyl)-ethylsulfone. | do | Co | Bluish green. |
| Do | do | Cr | Do. |
| 4-nitro-2-aminophenol-6-sulfonic acid. | do | Co | Do. |
| 4-nitro-2-aminophenol | Imidazole | Co | Grey. |
| Do | 4-phenylimidazole | Co | Do. |
| 4-chloro-2-aminophenol | do | Co | Do. |
| 4-nitro-2-aminophenol | 4,5-dimethylimidazole | Co | Blue green. |
| 2-aminophenol-4-sulfonic acid-β-hydroxyethyl-amide. | 4,5-diphenylimidazole | Co | Do. |
| 6-chloro-2-aminophenol-4-sulfone acid-β-hydroxyethylamide. | do | Co | Do. |

EXAMPLE 3

4.3 parts of the metal-free dyestuff obtained according to Example 1 are stirred with 35 parts of dimethylformamide, 9 parts of 18% copper sulfate solution are added and it is stirred at room temperature for 12 hours. The separation of the copper complex is completed by the addition of 50 parts of water. The dyestuff is filtered off with suction and dried, and in this form it consists of a dark powder which dyes synthetic superpolyamide fibres to greenish blue shades.

When a solution of 3.1 parts of crystalline nickel sulfate in 10 parts of water is employed in place of the copper sulfate solution, the resultant dyestuff dyes synthetic superpolyamide fibres to bluish violet shades.

EXAMPLE 4

A suspension of the diazo compound prepared as usual from 13.8 parts of 4-nitro-2-amino-1-hydroxybenzene hydrochloride, 20 parts of 30% hydrochloric acid, 5 parts of sodium nitrite and 150 parts of water is added at 0–5° C. to a mixture of 17 parts of 4,5-diphenylimidazole, 100 parts of pyridine, 40 parts of 40% sodium hydroxide solution and 50 parts of ice. When coupling has been completed, the dyestuff is precipitated by the addition of 140 parts of 30% hydrochloric acid, washed with water and dried. It is obtained as an orange coloured powder and has the formula

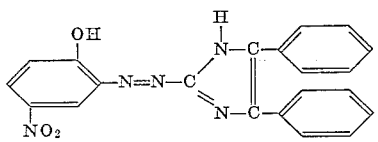

EXAMPLE 5

An ammoniacal cobaltic salt solution is prepared from 3 parts of crystalline cobalt sulfate by analogy with Example 2 and this is added at 80–90° C. to a mixture of 8.4 parts of the dyestuff prepared according to Example 4, 100 parts of formamide and 15 parts of 40% sodium hydroxide solution. The mixture is heated at 80–90° C. for 30 minutes and after cooling it is diluted with 500 parts of water. The resultant cobalt complex is filtered off with suction and washed with water. When dried, it consists of a dark powder.

1 part of the dry dyestuff is dispersed in 1000 parts of softened water with the aid of one part of a naphthalene-sulphonic acid/formaldehyde condensation product and 1 part of a levelling agent based on alkylphenyl-polyglycol ether is added. 100 parts of synthetic superpolyamide yarn are added at 50° C. and the temperature is increased to about 100° C. Dyeing is continued at this temperature for one hour. After rinsing, a strongly bluish green dyeing is obtained, which is characterized by good fastness to light, washing, perspiration and sea water.

EXAMPLE 6

3.1 parts of the monoazo dyestuff 4-nitro-2-aminophenol→4,5-diphenylimidazole in a mixture of 50 parts of formamide and 50 parts of dimethylformamide are heated at 120–130° C. under reflux for 8 hours with 1.3 parts of crystalline chromic chloride, whilst stirring. After it has cooled, the reaction mixture is poured into 500 parts of water and adjusted to be acidic to Congo red by the addition of hydrochloric acid. When dried, the chromium complex consists of a dark powder which dyes synthetic superpolyamide fibers from a neutral or organic acid liquor to green shades with good fastness to washing, perspiration and sea water.

Dyestuffs with similar properties are obtained when the dyestuff in this example is replaced by monoazo dyestuffs from the diazo and coupling components specified in the following table and these are converted to the chromium or cobalt complex compounds:

| Diazo component | Coupling component | Type of complex | Color shade of complex on synthetic superpolyamide fibers |
|---|---|---|---|
| 5-nitro-2-amino-1-hydroxybenzene. | 4,5-diphenylimidazole | Co | Green. |
| 2-amino-phenol-4-sulfonic acid-dimethyl-amide | do | Co | Bluish green. |
| 4-chloro-2-amino-1-hydroxybenzene. | do | Co | Do. |
| 2-amino-phenol-5-sulfonic acid dimethyl amide | do | Co | Do. |
| 6-nitro-2-amino-4-acetylamine-1-hydroxybenzene. | do | Co | Do. |
| Do | do | Cr | Do. |
| 5-nitro-3-amino-2-hydroxy-1-methyl-benzene. | do | Co | Do. |
| Do | do | Cr | Green. |
| 4-chloro-6-nitro-2-amino-1-hydroxy-benzene. | do | Co | Bluish green. |
| Do | do | Cr | Do. |
| 4-chloro-5-nitro-2-amino-1-hydroxy-benzene. | do | Co | Do. |
| Do | do | Cr | Do. |
| 6-chloro-4-nitro-2-amino-1-hydroxy-benzene. | do | Co | Green. |
| Do | do | Cr | Do. |
| 4,6-dinitro-2-amino-1-hydroxybenzene. | do | Co | Do. |
| Do | do | Cr | Do. |
| 4,6-dichloro-2-amino-1-hydroxybenzene. | do | Co | Do. |
| 5-nitro-3-amino-4-hydroxy-1-methyl-benzene. | do | Co | Bluish green. |
| Do | do | Cr | Do. |

EXAMPLE 7

When a mixture of 4.2 parts of the monoazo dyestuff 4-nitro-2-amino - 1 - hydroxybenzene→4,5-diphenylimidazole and 4.2 parts of the monoazo dyestuff 5-nitro-2-amino-1-hydroxybenzene→4,5-diphenylimidazole is used to replace the dyestuff employed during the cobalting operation of Example 5 during that operation, a mixed cobalt complex dyestuff is obtained which also dyes synthetic superpolyamide fibers to green shades.

When a mixture of 4.6 parts of the monoazo dyestuff 2-aminophenol-4-sulfonic acid amide→4,5-diphenylimidazole and 4.4 parts of the monoazo dyestuff 2-aminophenol-4-sulfonic acid amide→1-phenyl-3-methyl-5-pyrazolone is employed, the dyestuff which is obtained dyes natural and synthetic superpolyamide fibers to yellowish olive shades with good fastness to light and wetting.

Dyestuffs with similar properties are obtained by mixed cobalting of the monoazo dyestuffs I and II specified in the following table:

| I | II | Color shade on superpolyamide fibers |
|---|---|---|
| 4-nitro-2-amino-1-hydroxybenzene→4,5-diphenylimidazole. | 5-nitro-2-amino-1-hydroxybenzene→4,5-diphenylimidazole. | Green. |
| Do | 4-chloro-2-amino-1-hydroxybenzene→4,5-diphenylimidazole. | Do. |
| Do | 2-aminophenol-5-sulfonic acid amide→4,5-diphenylimidazole. | Do. |
| Do | 2-aminophenol-4-sulfonic acid amide→acetoacetic acid anilide. | Olive green. |
| Do | 2-aminophenol-4-sulfonic acid amide→1-phenyl-3-methylpyrazolone-(5). | Olive. |
| Do | 2-aminophenol-4-sulfonic acid amide→2-hydroxynaphthalene. | Violet. |
| 5-nitro-2-amino-1-hydroxybenzene→4,5-diphenylimidazole. | 2-aminophenol-4-sulfonic acid amide→4,5-diphenylimidazole. | Green. |
| Do | 4-chloro-2-amino-1-hydroxybenzene→4,5-diphenylimidazole. | Do. |
| Do | 2-aminophenol-4-sulfonic acid amide→acetoacetic acid anilide. | Olive. |
| Do | 2-aminophenol-4-sulfonic acid amide→1-phenyl-3-methyl-5-pyrazolone. | Yellowish olive. |
| Do | 2-aminophenol-4-sulfonic acid amide→2-hydroxynaphthalene. | Violet. |
| 2-amino-phenol-4-sulfonic acid amide→4,5-diphenylimidazole. | 4-chloro-2-amino-1-hydroxybenzene→4,5-diphenylimidazole. | Green. |
| Do | 2-aminophenol-4-sulfonic acid amide→acetoacetic acid anilide. | Olive green. |
| Do | 2-aminophenol-4-sulfonic acid amide→1-phenyl-3-methyl-5-pyrazolone. | Yellowish olive. |
| 2-aminophenol-4-sulfonic acid amide→4,5-diphenylimidazole. | 2-aminophenol-4-sulphonic acid amide→2-hydroxynaphthalene. | Violet. |
| 4-chloro-2-amino-1-hydroxybenzene→4,5-diphenylimidazole. | do | Do. |
| Do | 2-aminophenol-4-sulfonic acid amide→acetoacetic acid anilide. | Olive green. |
| Do | 2-aminophenol-4-sulfonic acid amide→1-phenyl-3-methyl-5-pyrazolone. | Olive. |
| 4-nitro-2-amino-1-hydroxybenzene→4,5-diphenylimidazole. | 4-nitro-2-amino-1-hydroxybenzene-6-sulfonic acid→4,5-diphenyl imidazole. | Green. |
| Do | 4-nitro-2-amino-1-hydroxy benzene→naphthylamine (2)-sulfonic acid-(5) | Bluish freen. |
| Do | 4-nitro-2-amino-1-hydroxybenzene→acetoacetic acid anilide. | Olive. |
| Do | 4-nitro-2-amino-1-hydroxybenezene→1-phenyl-3-methylpyrazolone-(5). | Do. |
| Do | 4-nitro-2-amino-1-hydroxybenezne→2-hydroxynaphthalene. | Black. |
| Do | do | Dark blue. |
| 2-aminophenol-4-sulfonic acid amide→4,5-diphenyl-imidazole. | 4-nitro-2-amino-1-hydroxybenzene-6-sulfonic acid→4, 5-diphenyl imidazole. | Bluish green. |
| Do | 4-nitro-2-amino-1-hydroxybenzene→acetoacetic acid anilide. | Khaki. |
| Do | 4-nitro-2-amino-1-hydroxybenzene→1-phenyl-3-methylpyrazolone-(5). | Do. |
| Do | 4-nitro-2-amino-1-hydroxybenzene→2-hyrdoxynaphthalene. | Black. |
| Do | 2-aminophenol-5-sulfonic acid-dimethylamide→2-hydroxynaphthalene. | Blue. |
| Do | 3-amino-4-hydroxy-1-methyl benzene→2-hydroxynaphthalene. | Do. |
| Do | 5-nitro-2-amino-1-hydroxybenzene→2-hydroxynaphthalene. | Do. |
| Do | 5-nitro-3-amino-4-hydroxy-1-methylbenzene→2-hydroxynapththalene. | Do. |
| Do | 4-nitro-2-amino-1-hydroxybenzene→2-hydroxy-8-acetylaminonaphthalene. | Blue green. |
| Do | 6-nitro-2-amino-4-acetylamino-1-hydroxybenzene→2-hydroxy-8-methyl-sulfonylaminonaphthalene. | Do. |
| Do | 2-aminophenol-5-sulfonic acid dimethylamide→3-hydroxy-diphenylamine. | Blue. |
| 4-chloro-2-amino-1-hydroxybenzene→4,5-diphenylimidazole. | 4-nitro-2-amino-1-hydroxybenzene-6-sulfonic acid→4, 5-diphenyl-imidazole. | Green. |
| Do | 4-nitro-2-amino-1-hydroxybenzene→acetoacetic acid anilide. | Olive. |
| Do | 4-nitro-2-amino-1-hydroxybenzene→1-phenyl-3-methylpyrazolone-(5). | Do. |
| Do | 4-nitro-2-amino-1-hydroxybenzene→2-hydroxynaphthalene. | Black. |
| Do | 5-nitro-2-amino-1-hydroxybenzene→2-hydroxynaphthalene. | Dark blue. |

EXAMPLE 8

9.9 parts of 2-aminobenzoic acid in 150 parts of water and 20 parts of 30% hydrochloric acid are diazotized as usual with 5 parts of sodium nitrite and the diazotized solution is added at 0–5° C. to a mixture of 17 parts of 4,5-diphenylimidazole, 100 parts of pyridine, 40 parts of 40% sodium hydroxide solution and 50 parts of ice. When coupling has been completed, the dyestuff is precipitated by the addition of 140 parts of 30% hydrochloric acid and it is filtered off with suction. When dried, the dyestuff consists of a red powder. The dyestuff has the formula

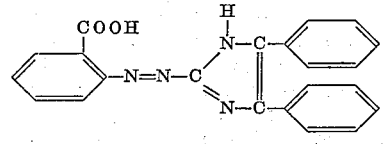

8.1 parts of this dyestuff in 100 parts of formamide and 15 parts of 40% sodium hydroxide solution are metallized at about 80° C. with an amoniacal solution of cobaltic salt from 3 parts of crystalline cobaltic sulfate (by analogy with Example 5) and the resultant dyestuff-cobalt complex is precipitated by the addition of 100 parts of water. It dyes synthetic superpolyamide fibers and wool to clear Bordeaux shades.

5.4 parts of the metal-free dyestuff in this example are heated in 100 parts of formamide at 80° C. for 4 hours with 2.2 parts of crystalline chromic chloride, whilst stirring. After it has cooled, the solution is diluted with 400 parts of water and the dyestuff-chromium complex is precipitated by the addition of 40 parts of sodium chloride. It dyes synthetic superpolyamide fibers and wool to clear violet shades.

If replacing the dyestuff of this example by monoazo dyestuff from the diazo and coupling components listed in the following table and converting them into the chromium or cobalt complex compounds, dyestuffs and similar properties are obtained.

| Diazo component | Coupling component | Type of complex | Color shade of complex on superpolyamide |
|---|---|---|---|
| 2-amino-4-acetylamino-benzoic acid. | 4,5-diphenyl-imidazole. | Co | Violet. |
| 2-amino-5-acetylamino-benzoic acid. | do | Co | Do. |
| 2-amino-4-methoxy-benzoic acid. | do | Co | Do. |
| 2-amino-5-methoxy-benzoic acid. | do | Co | Do. |

EXAMPLE 9

4.05 parts of the monoazo dyestuff 2-aminobenzoic acid →4,5-diphenylimidazole and 4.55 parts of the monoazo dyestuff 2-aminophenol-4-sulfonic acid amide→4,5-diphenylimidazole are heated to 80° C. with 150 parts of water and 15 parts of 40% sodium hydroxide solution.

At this temperature, an ammoniacal solution of cobaltic salt is added with stirring in analogous manner to Example 5. After completion of the metallization the dyestuff is precipitated at pH 9 with dilute acetic acid. It dyes superpolyamide fibers blue shades.

Dyestuffs with similar properties are obtained by mixed cobalting of the monoazo dyestuffs obtained by coupling the diazo and coupler corresponding to the amine/coupler pairs in I and II specified in the following table.

| I | II | Color shade on superpolyamide |
|---|---|---|
| 2-aminobenzoic acid →4,5-diphenylimidazole. | 4-nitro-2-amino-1-hydroxy benzene→acetoacetic acid anilide. | Red brown. |
| Do. | 2-aminophenol-4-sulfonic acid amide→1-phenyl-3-methyl-pyrazolone-(5). | Do. |
| 2-amino-4-acetylamino-benzoic acid→4,5-diphenylimidazole. | 2-aminophenol-4-sulfonic acid amide→4,5-diphenylimidazole. | Blue. |
| Do. | 4-nitro-2-amino-1-hydroxy-benzene→acetonetic acid anilide. | Dark brown. |
| 2-amino-5-acetylamino-benzoic acid→4,5-diphenylimidazole. | ...do... | Do. |
| Do. | 4-nitro-2-amino-1-hydroxy-benzene→1-phenyl-3-methyl-pyrazolone-(5). | Do. |
| Do. | 2-aminophenol-4-sulfonic acid amide→4,5-diphenylimidazole. | Blue. |

We claim:
1. A metal complex of one atom of (1) a metal having an atomic number from 24 to 29 and one or two molecules of (2) an azo dyestuff of the formula:

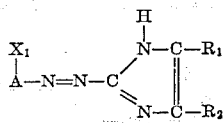

in which A is a member selected from the group consisting of phenylene, naphthylene, and phenylene or naphthylene substituted with members selected from the group consisting of lower alkyl, lower alkoxy, Cl, Br, nitro, acetyl, acetylamino, sulfo, sulfonamide, lower alkyl sulfonamide, di-lower alkyl sulfonamide, hydroethylsulfonamide, sulfonic acid anilide, and lower alkyl sulfonyl; $X_1$ is a substituent in the o-position to the azo group capable of being complexed with a metal and is selected from the group consisting of hydroxyl, carboxyl, and chloro; and $R_1$ and $R_2$, taken separately, are members selected from the group consisting of hydrogen, lower alkyl, phenyl, chlorophenyl, lower alkoxyphenyl, di-lower alkyl aminophenyl, hydroxyphenyl, bromophenyl, and furyl groups, and, taken together, are the member of a cyclohexane ring.

2. A dyestuff of claim 1 wherein the complex bound metal is selected from the class consisting of cobalt and chromium, one atom of metal being in complex union with substantially two molecules of said azo dyestuff.

3. An azo dyestuff comprising the complex of one atom of a metal selected from the group consisting of chromium and cobalt and substantially two molecules of complex-forming azo dyestuffs selected from the group consisting of compounds having the formula:

(1)
(2)

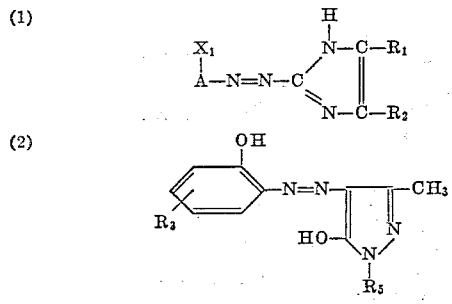

(3)
(4)
(5)

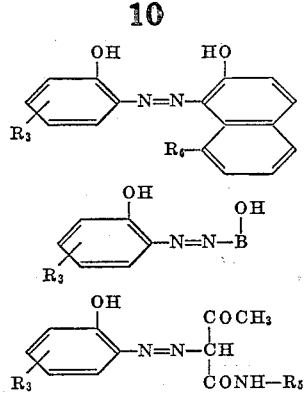

in which at least one of said compounds has the formula (1) and in which A is a member selected from the group consisting of phenylene, naphthylene, and phenylene or naphthylene substituted with members selected from the group consisting of lower alkyl, Cl, Br, acetyl, nitro, acetylamino, sulfo, sulfonamide, lower alkyl sulfonamide, di-lower alkyl sulfonamide, hydroxyethylsulfonamide, sulfonic acid anilide, and lower alkyl sulfonyl; B is a residue selected from the group consisting of enolic and phenolic compounds containing the —OH group in adjacent position to the azo bridge; $X_1$ is a substituent in the o-position to the azo group capable of being complexed with metal and is selected from the group consisting of hydroxyl, carboxyl, and chloro; $R_1$ and $R_2$, taken separately, are members selected from the group consisting of hydrogen, lower alkyl, phenyl, chlorophenyl, lower alkoxyphenyl, di-lower alkyl aminophenyl, hydroxyphenyl, bromophenyl, and furyl groups, and, taken together, are the members of a cyclohexane ring; $R_3$ is a member selected from the group consisting of sulfonamide, lower alkyl substituted sulfonamide, di-lower alkyl substituted sulfonamide, nitro, hydrogen, and chloro; $R_5$ is phenyl; and $R_6$ is a member selected from the group consisting of hydrogen, lower alkyl —CONH—, and lower alkyl —SO$_2$—NH—.

4. The 2:1 cobalt complex of a dyestuff of the formula

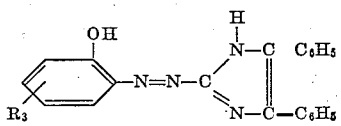

wherein $R_3$ is a member selected from the class consisting of sulfonamide, lower alkyl substituted sulfonamide, di-lower alkyl substituted sulfonamide, hydroxyethylsulfonamide, nitro, chloro, and hydrogen.

5. The 2:1 cobalt complex of a dyestuff of the formula

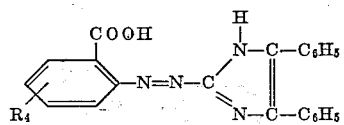

wherein $R_4$ is a member selected from the class consisting of lower alkoxy, acetylamino, lower alkyl sulfonylamino, and hydrogen.

6. The mixed 2:1 cobalt complex of the dyestuffs of the formulae

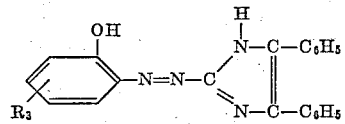

and

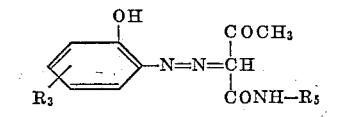

wherein $R_3$ stands for a member selected from the class consisting of sulfonamide, lower alkyl substituted sulfonamide, di-lower alkyl substituted sulfonamide, hydroxyethylsulfonamide, nitro, hydrogen, and chloro, and $R_5$ stands for phenyl.

7. The mixed 2:1 cobalt complex of the dyestuffs of the formulae

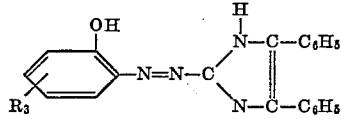

and

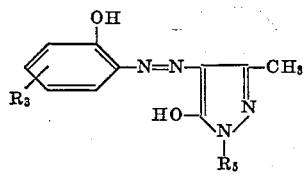

wherein $R_3$ is a member selected from the class consisting of sulfonamide, lower alkyl substituted sulfonamide, di-lower alkyl substituted sulfonamide, hydroxyethylsulfonamide, nitro, hydrogen, and choloro, and $R_5$ is phenyl.

8. The mixed 2:1 cobalt complex of the dyestuffs of the formulae

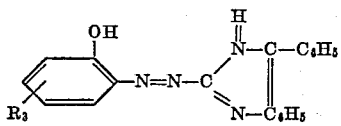

and

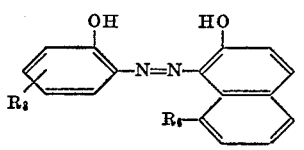

wherein $R_3$ is a member selected from the class consisting of sulfonamide, lower alkyl substituted sulfonamide, di-lower alkyl substituted sulfonamide, hydroxyethylsulfonamide, hydrogen, nitro, and chloro, and $R_6$ is a member selected from the class consisting of hydrogen, acetylamino, and lower alkyl sulfonylamino.

9. The mixed 2:1 cobalt complex of the dyestuffs of the formulae

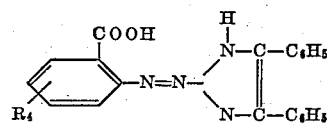

and

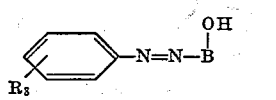

wherein $R_3$ is a member selected from the class consisting of sulfonamide, lower alkyl substituted sulfonamide, di-lower alkyl substituted sulfonamide, hydroxyethylsulfonamide, nitro, hydrogen, and chloro, $R_4$ is a member selected from the class consisting of lower alkoxy, acetylamino, lower alkyl sulfonylamino, and hydrogen, and B is a residue selected from the class consisting of enolic and phenolic compounds containing the OH group in adjacent position to the azo bridge.

10. The 2:1 cobalt complex of the dyestuff of the formula

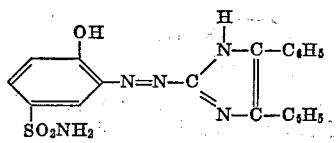

11. The 2:1 cobalt complex of the dyestuff of the formula

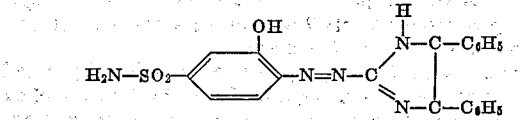

12. The 2:1 cobalt complex of the dyestuff of the formula

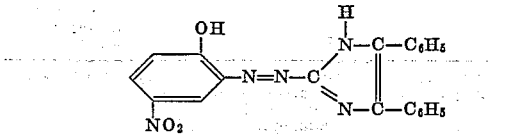

13. The 2:1 cobalt complex of the dyestuff of the formula

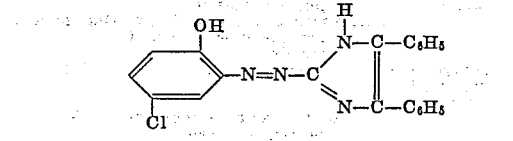

14. The 2:1 cobalt complex of the dyestuff of the formula

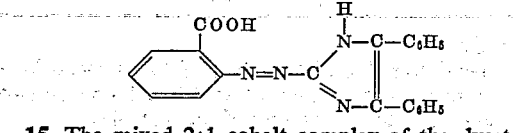

15. The mixed 2:1 cobalt complex of the dyestuffs of the formulae

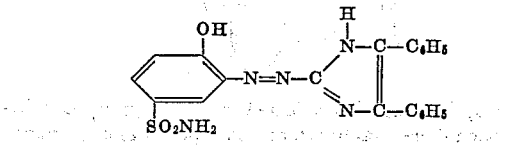

and

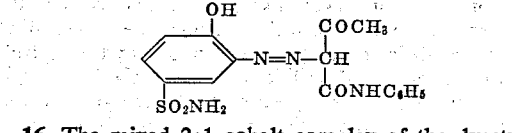

16. The mixed 2:1 cobalt complex of the dyestuffs of the formulae

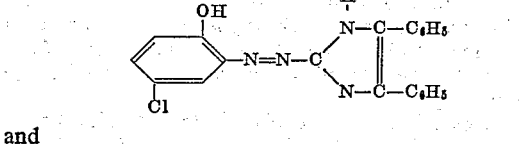

and

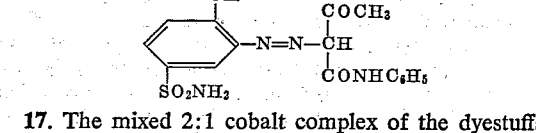

17. The mixed 2:1 cobalt complex of the dyestuffs of the formulae

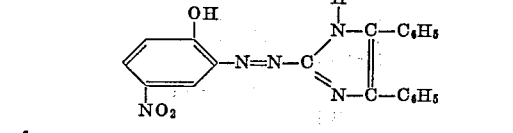

and

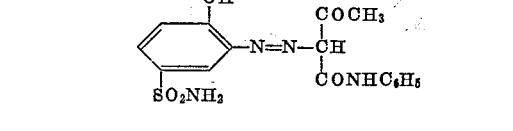

18. The mixed 2:1 cobalt complex of the dyestuffs of the formulae
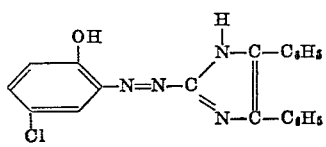
and
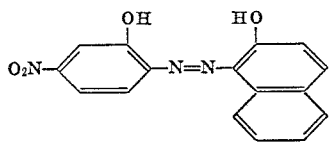
19. The mixed 2:1 cobalt complex of the dyestuffs of the formulae
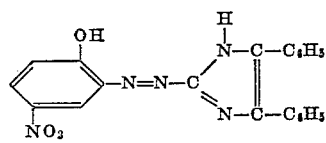
and
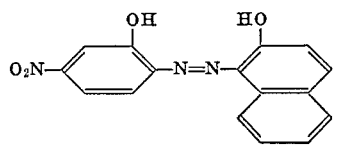
20. The mixed 2:1 cobalt complex of the dyestuffs of the formulae
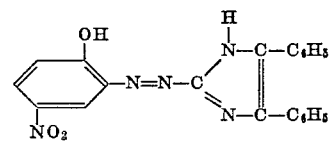
and
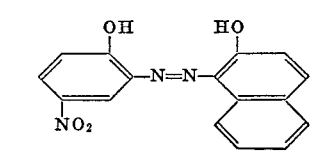
References Cited
UNITED STATES PATENTS
3,102,879  9/1963  Bauman et al. _____ 260—157
CHARLES B. PARKER, Primary Examiner
C. T. WARREN, Assistant Examiner

PO-1050
(5/69)

UNITED STATES PATENT OFFICE
CERTIFICATE OF CORRECTION

Patent No. 3,468,871                     Dated September 23, 1969

Inventor(s) KLAUS LEVERENZ and ALOIS GOTTSCHLICH

It is certified that error appears in the above-identified patent and that said Letters Patent are hereby corrected as shown below:

Column 1, line 40, that portion of the formula reading

-N=-N- should read -N=N- .

Column 2, line 5, "heteroatoms." should read --hetero atoms.--. Column 3, line 17, "-7-aminobenzene" should read -- -1-aminobenzene --; Column 3, line 22, "-3-aminobenzene" should read -- -2-aminobenzene --; Column 3, line 44, "4,5-bis-(4"-" should read --4,5-bis-(4'- --; Column 3, line 75, "of synthetic" should read --or synthetic--.

Column 7, line 2 of Table under heading I "4,5-diohenyl-" should read -- 4,5-diphenyl- --; Column 7, line 45, "bluish freen" should read, --bluish green--; Column 7, line 50, "benezene" should read, --benzene--; Column 7, line 52 under heading II, Table, "benezne" should read --benzene--; Column 7, line 60, under heading II of the Table, "hyrdoxy-" should read -- hydroxy- --; Column 7, line 64 under heading II of the Table, "methyl benzene" should read --methyl-benzene--.

Column 8, line 55, "dyestuffs and" should read --dyestuffs with--.

Column 9, line 53, "the member" should read --the members--; Column 9, line 44, "hydroethylsul-" should read --hydroxyethylsul--.

Column 11, line 10, that portion of the formula reading

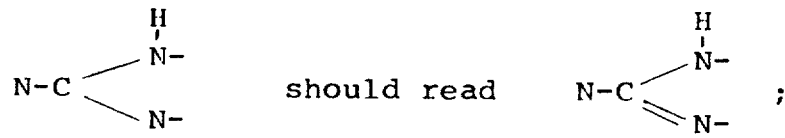

Page Two
Column 11, line 23, "choloro," should read --chloro,--; Column 11, line 30, that portion of the formula reading
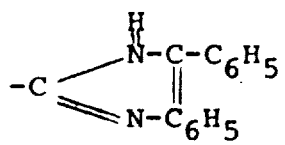     should read     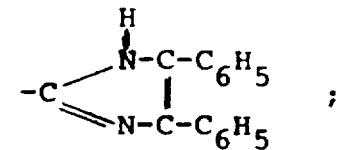 ;
Column 11, line 50, that portion of the formula reading
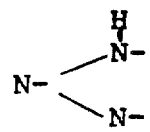     should read     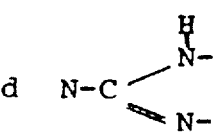 .
Column 12, line 5, that portion of the formula reading
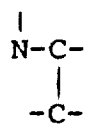     should read     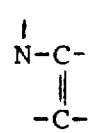 ;
Column 12, line 50, that portion of the formula reading
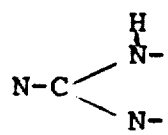     should read     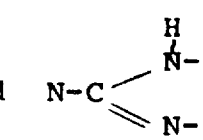 .